US006591169B2

(12) United States Patent
Jones et al.

(10) Patent No.: US 6,591,169 B2
(45) Date of Patent: Jul. 8, 2003

(54) METHOD AND COMPUTER PROGRAM PRODUCT FOR CONTROLLING THE ACTUATORS OF AN AERODYNAMIC VEHICLE

(75) Inventors: Richard D. Jones, Issaquah, WA (US); Thomas E. Speer, Des Moines, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/967,446

(22) Filed: Sep. 27, 2001

(65) Prior Publication Data

US 2003/0088341 A1 May 8, 2003

(51) Int. Cl.⁷ .............................. G06F 7/00; G05D 1/00; G08B 23/00
(52) U.S. Cl. ............................ 701/4; 244/175; 244/181; 340/967
(58) Field of Search ................................ 701/1, 3, 4, 8, 701/11, 14; 244/175, 180, 181; 340/945, 963, 967

(56) References Cited

U.S. PATENT DOCUMENTS

| 3,940,673 A | 2/1976 | Darlington |
| 4,872,104 A | 10/1989 | Holsinger |
| 5,528,119 A | 6/1996 | Rundqwist et al. |
| 5,561,598 A | 10/1996 | Nowak et al. |
| 5,695,156 A | 12/1997 | Firuz et al. |
| 6,047,927 A | 4/2000 | Heiberg et al. |
| 6,128,554 A | 10/2000 | Damotte |
| 6,246,960 B1 | 6/2001 | Lin |

Primary Examiner—William A. Cuchlinski, Jr.
Assistant Examiner—Edward Pipala
(74) Attorney, Agent, or Firm—Alston & Bird LLP

(57) ABSTRACT

A method and computer program product are provided for controlling the actuators of an aerodynamic vehicle to affect a desired change in the time rate of change of the system state vector. The method initially determines the differences between anticipated changes in the states of the aerodynamic vehicle based upon the current condition of each actuator, and desired state changes. The differences between the anticipated and desired state changes may be weighted based upon a predetermined criteria, such as the importance of the respective states and/or the weight to be attributed to outliers. The differences between the anticipated and desired state changes are converted to the corresponding rates of change of the actuators. These changes in the actuators may be limited to within predefined bounds. Control signals are then issued to the actuators to affect the desired change in the time rate of change of the system state vector.

42 Claims, 2 Drawing Sheets

METHOD AND COMPUTER PROGRAM PRODUCT FOR CONTROLLING THE ACTUATORS OF AN AERODYNAMIC VEHICLE

FIELD OF THE INVENTION

The present invention relates generally to a method of controlling a plurality of actuators of an aerodynamic vehicle and, more particularly, to a method for controlling a plurality of actuators of an aerodynamic vehicle in order to efficiently cause a desired change in the time rate of change of the system state vector of the erodynamic vehicle.

BACKGROUND OF THE INVENTION

Flight control of aerodynamic vehicles, such as aircraft, is accomplished via a variety of flight control actuators. These flight control actuators include aerodynamic controls such as the rudder, elevators, ailerons, speed brakes, engine thrust variations, thrust vectoring and the like. By altering the various flight control actuators, the system state vector that defines the current state of the aerodynamic vehicle can be changed. In this regard, the system state vector of an aerodynamic vehicle typically defines a plurality of current vehicle states such as the angle of attack, the angle of side slip, the air speed, the vehicle attitude and the like.

Historically, the flight control actuators were directly linked to various input devices operated by the pilot. For example, flight control actuators have been linked via cabling to the throttle levers and the control column or stick. More recently, the flight control actuators have been driven by a flight control computer which, in turn, receives inputs from the various input devices operated by the pilot. By appropriately adjusting the input devices, a pilot may therefore controllably alter the time rate of change of the current system state vector of the aerodynamic vehicle.

Unfortunately, flight control actuators may occasionally fail, thereby adversely affecting the ability of conventional control systems to maintain the dynamic stability and performance of the aerodynamic vehicle. In order to accommodate failures of one or more of the flight control actuators, actuator failure detection and flight control reconfiguration systems have been developed. These systems typically remove the flight control actuator that has been identified as inoperable from the control system. These systems are therefore designed to detect the failure of one or more flight control actuators and to alter the control logic associated with one or more of the flight control actuators that remain operable in an attempt to produce the desired change in the time rate of change of the current system state vector of an aerodynamic vehicle requested by the pilot. These actuator failure detection and flight control reconfiguration systems are highly complex. As such, the proper operation of these systems is difficult to verify. Moreover, these systems introduce a risk that a flight control actuator that is actually functioning properly may be falsely identified as having failed and thereafter removed from the control system, thereby potentially and unnecessarily rendering the control system less effective.

Additionally, flight control actuators generally have some limitations on their performance. In this regard, the rate of change accommodated by most flight control actuators is generally limited to a range bounded by upper and lower limits. Similarly, the actual position which many flight control actuators may assume is also typically limited to a range bounded by upper and lower limits. Unfortunately, conventional control systems do not accommodate limitations in the range of positions and rate of change of a flight control actuator. As such, conventional control systems may attempt to alter a flight control actuator in a manner that exceeds its limitations. Since the flight control actuator will be unable to make the desired change, the control system may correspondingly fail to produce the desired change in the time rate of change of the system state vector of the aerodynamic vehicle.

As such, it would be desirable to develop an improved method for controlling the actuators of an aerodynamic vehicle. In particular, it would be desirable to develop a method of controlling an aerodynamic vehicle which provides increased flexibility with respect to the removal or inclusion of a flight control actuator that may have failed. In addition, it would be advantageous to provide a method for controlling the actuators of an aerodynamic vehicle in a manner that recognizes and accommodates limitations in the range of positions and rate of change of at least some of the actuators.

SUMMARY OF THE INVENTION

An improved method and computer program product are therefore provided for controlling the plurality of actuators of an aerodynamic vehicle in order to efficiently bring about a desired change in the time rate of change of the system state vector of the aerodynamic vehicle. In this regard, the method and computer program product of one aspect of the present invention permits the control of the actuators to be tailored based upon predetermined criteria, such as the relative importance of the respective states of the aerodynamic vehicle and/or the weighting to be given to any outlier measurements. According to another aspect, the method and computer program product control the plurality of actuators while recognizing limitations upon the permissible changes to at least one actuator, such as limitations upon the rate of change or the range of positions of at least one actuator. As such, the method and computer program product of the present invention address the shortcomings of conventional control systems and efficiently command the actuators so as to alter the time rate of change of the system state vector of the aerodynamic vehicle in a desired manner.

The method and computer program product control the actuators of an aerodynamic vehicle by initially determining the differences between anticipated changes in the plurality of states of the aerodynamic vehicle based upon the current condition of each of the actuators and desired changes in the plurality of states of the aerodynamic vehicle. In order to determine the differences between the anticipated and desired changes in the plurality of state rates of the aerodynamic vehicle, the dot product of a vector representing the current commanded state of each actuator and a matrix representing changes in the plurality of states of the aerodynamic vehicle in response to changes in the actuators is initially determined. In this regard, the matrix includes a plurality of terms, each of which represents the anticipated change in a respective state rate of the aerodynamic vehicle in response to the change of a respective actuator. In order to determine the difference between the anticipated and desired changes in the plurality of states of the aerodynamic vehicle, the vector difference between the dot product and a vector representing the desired change in the plurality of states of the aerodynamic vehicle is then obtained.

According to one aspect of the present invention, the differences between the anticipated and desired changes in the plurality of states of the aerodynamic vehicle are then weighted based upon a predetermined criteria. In this regard, the differences may be weighted based upon the relative importance of the respective states of the aerodynamic vehicle, thereby permitting those states which are believed to be of greater importance to be assigned a correspondingly greater weight. As a result of this greater weight, the method and computer program product of this aspect of the present invention will control the actuators so as to more quickly alter these states than other states having lower weights assigned thereto. In addition or in the alternate, the differences may be nonlinearly weighted by a predefined penalty based upon the emphasis to be placed upon outliers, i.e., relatively large differences between the anticipated and desired changes in the plurality of states of the aerodynamic vehicle.

Based upon the weighted differences between the anticipated and desired changes in the plurality of states of the aerodynamic vehicle, the method and computer program product may determine a second dot product of the weighted vector difference and a transpose of the matrix representing changes in the state rates of the aerodynamic vehicle in response to changes in the plurality of actuators. The second dot product therefore represents the changes in the actuators required to affect the desired changes in the plurality of states of the aerodynamic vehicle, given the anticipated changes in the plurality of states. As such, the weightings assigned to the respective states of the aerodynamic vehicle will correspondingly effect changes in the desired state of the actuators. The second dot product may also be weighted by a gain matrix, one term of which is associated with each actuator in order to appropriately weight the relative contributions of the actuators.

According to another advantageous aspect of the present invention, the method and computer program product may also limit the permissible changes of at least one of the actuators. In this regard, the permissible rate of change of one or more of the actuators may be limited. Similarly, the position of one or more of the actuators may also be limited to within a predefined range. As such, the method and computer program product of the present invention effectively recognize and accommodate limitations of the actuators, thereby preventing any attempts to drive the actuators beyond their predefined limitations.

The method and computer program product then issue control signals to the plurality of actuators so as to implement at least a portion of the desired change in the time rate of change of the system state vector of the aerodynamic vehicle. In those aspects of the present invention in which the differences between the anticipated and desired changes in the plurality of states of the aerodynamic vehicle are weighted, the control signals are at least partially based upon the weighted differences. More particularly, in those embodiments in which the second dot product of the weighted vector difference and the transpose of the matrix representing changes in the system state vector of the aerodynamic vehicle in response to the changes in the plurality of actuators is determined, the control signals are at least partially based upon the second dot product. Moreover, the control signals may be more directly weighted by the gain matrix. Additionally, in those aspects of the present invention in which the permissible changes of at least one of the actuators is limited, the control signals issued to the actuators are subject to the limitations in the permissible changes of one or more of the actuators. Thus, at least a portion of the desired change in the plurality of states of the aerodynamic vehicle may be implemented without exceeding the permissible changes of the actuators.

Thus, the method and computer program product of the present invention provide an improved technique for efficiently controlling the actuators of an aerodynamic vehicle in order to effect the desired change in the time rate of change of the system state vector of the aerodynamic vehicle. According to one aspect of the present invention, the control of the actuators may be influenced by weighting based upon a predetermined criteria, thereby permitting the control system to be more individually tailored. Based upon the weighting, the method and computer program product also bring about the desired change in the time rate of change of the system state vector of the aerodynamic vehicle in the most efficient manner by minimizing the cost as defined at least partially by the weighting. According to another aspect of the present invention, the permissible changes of one or more of the actuators may be limited such that the desired change in the time rate of change of the system state vector of the aerodynamic vehicle may be affected without attempting to exceed the permissible changes of at one or more of the actuators.

BRIEF DESCRIPTION OF THE DRAWINGS

Figure 1:
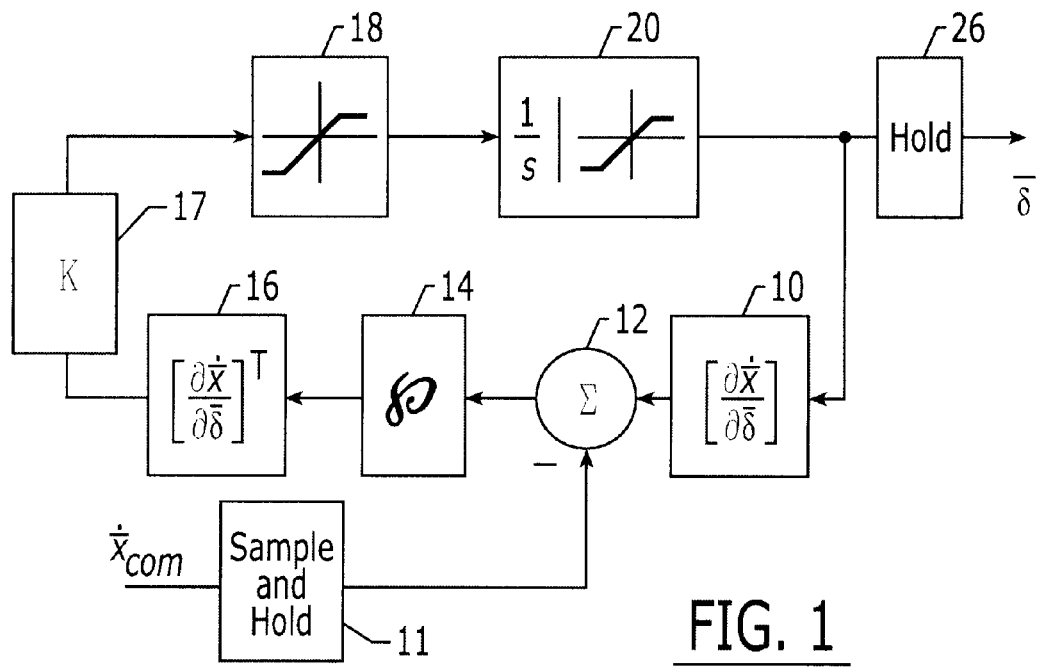
Figure 2:
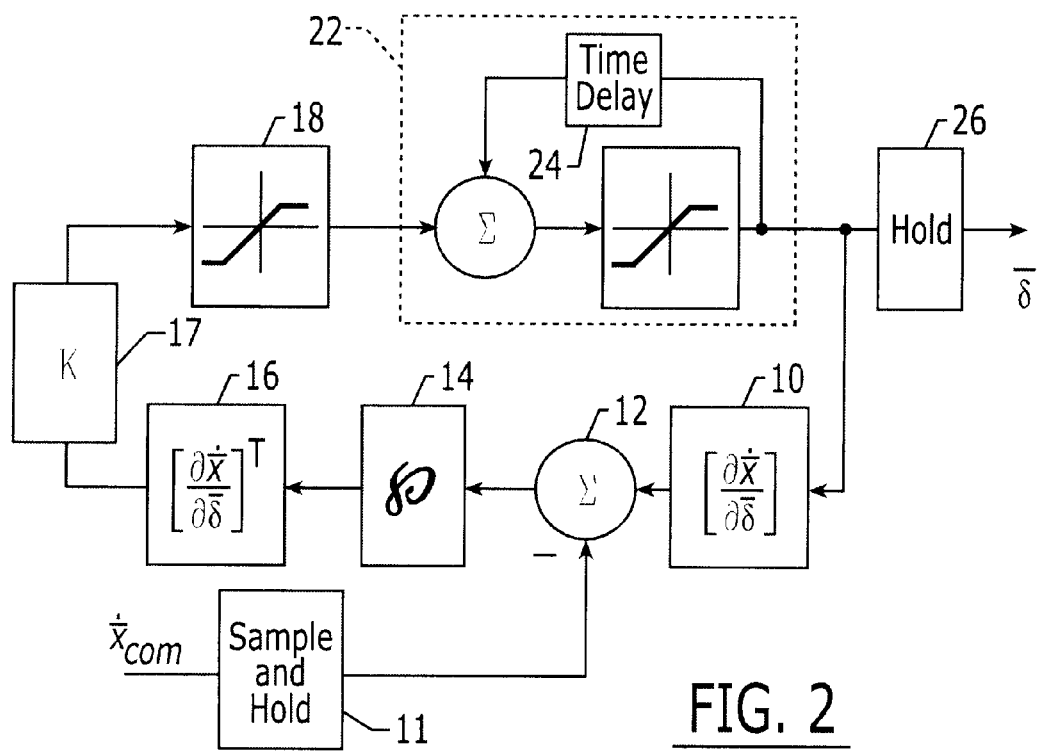
Figure 3:
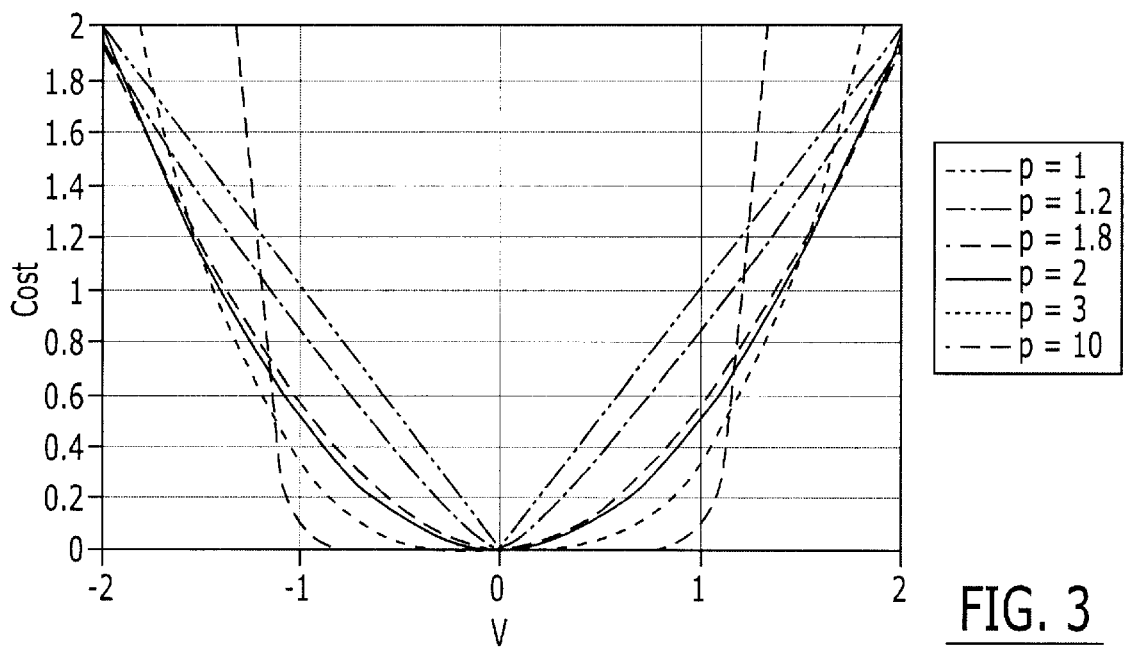
Figure 4:
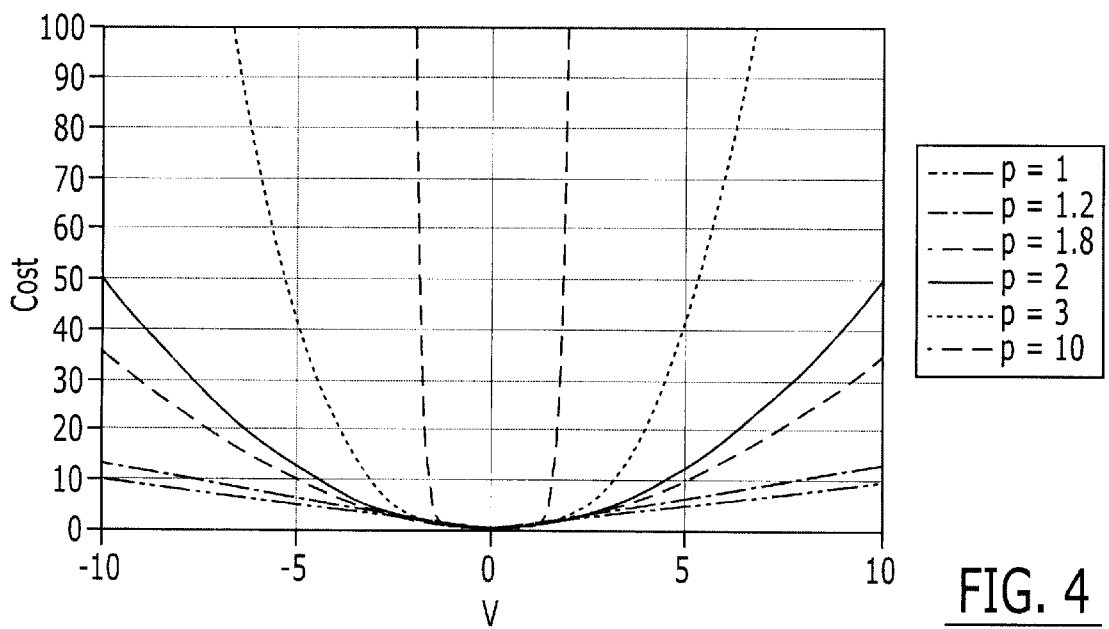

Having thus described the invention in general terms, reference will now be made to the accompanying drawings, which are not necessarily drawn to scale, and wherein:

FIG. 1 is a block diagram illustrating the operations performed by the method and computer program product of one embodiment of the present invention in a continuous mode;

FIG. 2 is a block diagram illustrating the operations performed by the method and computer program product of another embodiment of the present invention in a discrete mode;

FIG. 3 is a graph representing the affect attributable to the imposition of different predefined penalties; and FIG. 4 is an expanded view of the graph of FIG. 3 illustrating the affect of the imposition of different predefined penalties.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A method and a corresponding computer program product are provided for controlling the plurality of actuators of an aerodynamic vehicle, such as an aircraft. As known to those skilled in the art, aerodynamic vehicles have a wide variety of actuators with the type and number of actuators depending upon the type and model of the aerodynamic vehicle. By way of example, however, typical actuators include the rudder, elevators, ailerons, speed brakes, engine thrust variations, thrust variations and the like.

The control method may be implemented in either the continuous domain utilizing analog signals as illustrated in FIG. 1 or the discrete domain utilizing digital signals as illustrated in FIG. 2. Since the continuous and discrete models of the control method of the present invention are quite similar, the control method will be primarily described hereinbelow in conjunction with the continuous model, with those differences between the continuous model and the discrete model being separately described as appropriate. As also described hereinafter, the control method depicted in FIGS. 1 and 2 is automated and is generally implemented by means of a computer, such as a flight control computer or the like. As such, the control method is typically embodied in a computer program product which directs the flight control computer to issue appropriate commands to the plurality of actuators in order to control the aerodynamic vehicle as desired.

In either the continuous or discrete model, the current actuator commands $\delta_1$ are monitored, wherein i designates a respective actuator in this instance. The current actuator commands define the current state to which each actuator has been commanded. For example, the actuator commands associated with a control surface such as a rudder, elevator or aileron define the position to which the respective control surface is currently being directed to assume. Typically, the current actuator commands are represented by a vector $\bar{\delta}_i$ which includes a term defining the state to which each respective actuator is currently commanded.

Based upon the current actuator commands $\delta_i$, the anticipated changes in the plurality of states of the aerodynamic vehicle are determined. In this regard, an aerodynamic vehicle that is in flight has a number of states $x_i$ including the angle of attack, the angle of side slip, the air speed, the vehicle attitude, the altitude and the like, wherein i represents the respective state in this instance. As known to those skilled in the art, the states of an aerodynamic vehicle may vary somewhat depending upon the type and model of the aerodynamic vehicle, but are well defined for a respective type and model of aerodynamic vehicle. The current states of an aerodynamic vehicle are typically represented by a system state vector $\bar{x}$ as also known to those skilled in the art.

In order to determine the anticipated changes in the system state vector $\bar{x}$ of the aerodynamic vehicle based upon the current actuator commands $\delta_i$, a matrix $$\left[\frac{\partial \bar{\dot{x}}}{\partial \bar{\delta}}\right]$$

is defined that represents changes in the rate change of the respective states (hereinafter termed the state rates) of the aerodynamic vehicle in response to changes in the plurality of actuators. See block 10 of FIG. 1 and 2. The matrix includes a plurality of terms with each term representing the change in a respective state rate of the aerodynamic vehicle in response to the change of a respective actuator. As such, the matrix represents the manner in which the aerodynamic vehicle is anticipated to respond to changes in the actuators. Typically, the matrix is constructed to have a plurality of rows and a plurality of columns. Each column generally includes a plurality of terms, each of which defines the anticipated change in a respective state rate of the aerodynamic vehicle in response to the change in the same actuator. Thus, each column of the matrix represents the anticipated changes in the state rates of the aerodynamic vehicle due to a change of a respective actuator.

The matrix $$\left[\frac{\partial \bar{\dot{x}}}{\partial \bar{\delta}}\right]$$

may be constructed by a variety of techniques. In one technique, the matrix is constructed as a result of numerical calculations. In this technique, the current states $x_i$ of the aerodynamic vehicle and the current settings of the actuators are provided. Based upon the current states of the aerodynamic vehicle and the current settings of the actuators, the resulting forces and torques acting upon the aerodynamic vehicle are determined. By factoring out the mass and inertia of the aerodynamic vehicle, the state rates may be determined.

In order to determine the resulting forces and torques acting upon the aerodynamic vehicle, the aerodynamic coefficients for the current flight condition, as defined by the current states $x_i$ of the aerodynamic vehicle, are determined. As known to those skilled in the art, aerodynamic databases are available for most aerodynamic vehicles that define the various aerodynamic coefficients based upon the current states of the aerodynamic vehicle. The aerodynamic coefficients of an aerodynamic vehicle may vary based upon the type and model of the aerodynamic vehicle, but typically include coefficients such as lift, drag, pitching moment, side force, rolling moment, yawing moment and the like. While the aerodynamic coefficients may vary based upon the type and model of the aerodynamic vehicle, the aerodynamic coefficients for a particular type and model of aerodynamic vehicle will be well defined and known to those skilled in the art. For example, an aerodynamic database for a 777 model aircraft manufactured by The Boeing Company is provided along with each aircraft and defines 384 aerodynamic coefficients.

The resulting forces and torques upon the aerodynamic vehicle can then be determined based upon the aerodynamic coefficients and the mass of the aerodynamic vehicle by means of force buildup equations, also known to those skilled in the art. In this regard, the force buildup equations will also generally vary depending upon the type and model of aerodynamic vehicle. However, for a particular type and model of aerodynamic vehicle, the force buildup equations are well established and known to those skilled in the art. The anticipated changes in the state rates of the aerodynamic vehicle are then determined based upon finite differences. In this regard, one actuator is considered to have varied slightly, such as 1% or less, from its current state and the process of determining the resulting forces and torques acting upon the aerodynamic vehicle is repeated, albeit with the state of one actuator having been varied somewhat. The resulting change in the forces and torques acting upon the aerodynamic vehicle following the slight variation of one actuator are then determined. By factoring out the mass and inertia of the aerodynamic vehicle from the force buildup equations representative of the changes in the forces and torques occasioned by a slight variation in one actuator, the change in each state rate of the aerodynamic vehicle attributable to the change in the respective actuator may be determined, thereby defining one column in the resulting matrix.

$$\left[\frac{\partial \dot{x}}{\partial \delta}\right].$$

The foregoing process of slightly varying a respective actuator and determining the resulting change in forces and torques acting upon the aerodynamic vehicle and, correspondingly, the resulting changes in the state rates of the aerodynamic vehicle is repeated for each actuator in order to construct the entire matrix.

Alternatively, the matrix $$\left[\frac{\partial \dot{x}}{\partial \delta}\right]$$

may be determined based upon an analytic calculation. According to this alternative technique, a nonlinear multidimensional polynomial curve may be fit to each respective aerodynamic coefficient defined by the aerodynamic database. In this regard, the aerodynamic database separately defines each aerodynamic coefficient at each of a large number of different flight conditions, with a respective flight condition defined by a respective system state vector $\bar{x}$ and the current state of the actuators. The nonlinear multidimensional polynomial curves may be fit to respective aerodynamic coefficients according to any of a variety of techniques. In one embodiment, however, the nonlinear multidimensional polynomial curves are fit to respective aerodynamic coefficients with a commercially available curve fitting computer program. Since the aerodynamic coefficients are now represented by curves, the partial derivatives of each aerodynamic coefficient with respect to a change in a respective actuator may then be readily determined by hand or, more commonly, by utilizing a commercially available program such as Mathematica. By utilizing the nonlinear multidimensional polynomial curve representing each aerodynamic coefficient and the vehicle mass and inertia, the force buildup equations for the aerodynamic vehicle may again be constructed. The partial derivatives of each force with respect to each aerodynamic coefficient may then be determined. By utilizing the chain rule and the partial derivatives of the aerodynamic coefficients with respect to changes in respective actuators and the partial derivatives of the forces with respect to respective aerodynamic coefficients, the partial derivatives of the forces with respect to changes in respective actuators may be determined. By factoring out the mass and inertia of the aerodynamic vehicle, the partial derivatives of the forces with respect to changes in respective actuators can be translated into the partial derivatives of the state rates of the aerodynamic vehicle with respect to changes in each actuator. Thereafter, the matrix can be constructed as described above.

Regardless of the manner in which the matrix $$\left[\frac{\partial \dot{x}}{\partial \delta}\right]$$

is to be constructed, the matrix is preferably determined in real time based upon the current flight conditions including the current actuator commands $\delta_i$ of the aerodynamic vehicle. Following construction of the matrix, the anticipated change in each state rate of the aerodynamic vehicle is determined by the vector multiplication of the vector $\bar{\delta}$ representing the current actuator commands and the matrix. In particular, the dot product of the vector representing the current actuator commands and the matrix is determined.

The desired change $\bar{\dot{x}}_{com}$ in the respective state rates of the aerodynamic vehicle is also provided, such as by pilot input, and is stored by a conventional sample and hold circuit 11. This desired change $\bar{\dot{x}}_{com}$ in the respective state rates of the aerodynamic vehicle may represent a change in the state rates of selected states of the aerodynamic vehicle or all of the states of the aerodynamic vehicle, typically depending upon the pilot input. In order to determine the manner in which the actuators must be controlled in order to affect the desired change $\bar{\dot{x}}_{com}$ in the respective state rates of the aerodynamic vehicle, the difference between the anticipated and desired changes in the state rates of the aerodynamic vehicle is determined. Since the desired change $\bar{\dot{x}}_{com}$ in the respective state rates of the aerodynamic vehicle is also typically represented by a vector, the vector difference between the dot product representing the anticipated change in state rates of the aerodynamic vehicle and the vector representing the desired changes in the state-rates is obtained as shown in block 12 of FIGS. 1 and 2.

According to one advantageous aspect of the present invention, the difference between the anticipated and desired changes in the state rates of the aerodynamic vehicle may be weighted based upon a predefined criteria. One predefined criteria defines the relative importance of the respective states of the aerodynamic vehicle. Thus, the differences between the anticipated and desired changes in the state rates of the aerodynamic vehicle, typically represented as a vector difference, can be weighted so as to affect changes in some states of the aerodynamic vehicle more rapidly than other states due to the relative importance of the states for which changes are more rapidly affected. As such, a respective weight $w_i$ may be assigned to each state of the aerodynamic vehicle, such as during system configuration or the like.

Another predetermined criteria is a predefined penalty $p_i$ that serves to place lesser or greater emphasis on outlier values. In this regard, the effect of the predefined penalty will vary based upon the magnitude of the difference between the anticipated and desired changes in the respective state rate of the aerodynamic vehicle, with relative large differences being considered outliers. For example, small penalties may be assigned to the outliers in those systems that are designed to factor the impact of the outliers into the control process, while large penalties may be assigned to outliers in those systems that desire to deemphasize the contributions of outliers since they may be attributable to an error.

In order to affect the weighting, the vector operator $\wp$ (designated 14 in FIGS. 1 and 2) is defined as follows:

$$\wp(\bar{v},\bar{w},\bar{p})_i = w_i \operatorname{sgn}(v_i) \|v_i\|^{p_i - 1}$$

wherein $w_i$ is the weight assigned to each state of the aerodynamic vehicle, $p_i$ is the predefined penalty assigned to each state of the aerodynamic vehicle and $v_i$ is the difference between the anticipated and desired changes in each state rate of the aerodynamic vehicle. Both $w_i$ and $p_i$ are defined to be greater than or equal to 0. By multiplying the vector difference between the anticipated and desired changes in the state rates of the aerodynamic vehicle and the vector operator $\wp$ as shown in block 14, the weighted differences between the anticipated and desired changes in the state rates of the aerodynamic vehicle are obtained.

These weighted differences between the anticipated and desired changes in the state rates of the aerodynamic vehicle are then converted to the corresponding changes in the actuators to bring about the desired changes $\bar{\dot{x}}_{com}$ in the state rates. In the illustrated embodiment, the weighted differences are multiplied by the transpose $$\left[\frac{\partial \dot{\bar{x}}}{\partial \bar{\delta}}\right]^T$$

of the matrix representing the changes in the state rates of the aerodynamic vehicle in response to the changes in the plurality of actuators as shown in block 16 of FIGS. 1 and 2. In other words, the dot product of the weighted vector difference and the transpose of the matrix representing changes in the state rates of the aerodynamic vehicle in response to changes in the plurality of actuators is determined. As such, the rate of changes $\dot{\delta}_i$ of the actuators required to affect the desired changes in the state rates of the aerodynamic vehicle subject to the anticipated changes in the state rates of the aerodynamic vehicle based upon the current commanded state of each actuator is determined. Since each term of the vector difference between the anticipated and desired changes in the state rates of the aerodynamic vehicle has been weighted, the resulting commands to the actuators to affect the desired change in the state rates of the aerodynamic vehicle are computed based upon the predetermined criteria, such as the relative importance of the respective states of the aerodynamic vehicle and/or the weighting to be given to any outlier measurements.

The rate of changes $\dot{\delta}_i$ of the actuators required to affect the desired changes in the state rates of the aerodynamic vehicle may also be weighted by a gain matrix as shown by block 17 based upon the relative or perceived importance of the respective actuators. The gain matrix $K_{i,j}$ is typically a diagonal, positive, semi-definite matrix, i.e., $\{k_{i=j} \geq 0\} \cap \{k_{i \neq j} = 0\}$, with one term of the gain matrix associated with the rate of change of each respective actuator. Typically the values of the gain matrix are selected in advance with values larger than one-serving to increase the rate of change of the respective actuator and values less than one serving to decrease the rate of change of the respective actuator. However, in instances in which the aerodynamic vehicle includes a failure detection system, the gain matrix may be revised in accordance with the output of the failure detection system in order to assign a small value, such as zero, to actuators that are believed to have failed.

Since actuators are typically subject to at least some limitations, such as limitations in the predefined range of the actuator and limitations in the permissible rate of change of the actuator, the method and computer program product of one advantageous aspect of the present invention limit the permissible change of each actuator that has these predefined limitations such that the resulting commands issued to the actuators do not attempt to exceed the limitations of the actuators. Different limitations may be imposed upon different actuators. For example, the control signals otherwise provided to the actuators may be limited, such as by a vector limiter as shown in block 18 of FIGS. 1 and 2, to prevent the respective actuator from being commanded to change at a rate that exceeds a predefined limit. In this regard, upper and/or lower limits may be predefined such that the permissible rate of change of the respective actuator must remain within the acceptable range bounded by the limit(s).

In order to convert the rates of change $\dot{\delta}_i$ of the actuators that have been determined to create the desired change in the state rates and, in turn, the state of the aerodynamic vehicle into actuator commands, the rates of change are integrated as represented by $$\frac{1}{s}$$

in block 20 of FIG. 1. The resulting commands may also be limited as shown in block 20 such that each actuator remains within a predefined range. For example, the position of a control surface may be limited so as to remain within a predefined range of positions, also typically defined by predefined upper and/or lower limits.

In contrast to the integration designated as $$\frac{1}{s}$$

in the continuous mode, the integration is performed somewhat differently in the discrete mode as shown in block 22 in FIG. 2. In this regard, a time delay 24 is built into the local feedback loop so as to work in combination with the summation to affect the integration in the discrete mode.

Once the desired changes in the actuators have been appropriately limited so as to prevent any actuator from being commanded to exceed its predefined limitations, the changes in each actuator that have been determined to affect the desired change in the state rates of the aerodynamic vehicle are issued as commands to each of the actuators and, in the illustrated embodiment, are stored by the zero order hold 26. As such, the desired change in the state rates and, in turn, the desired change in the time rate of change of the system state vector of the aerodynamic vehicle will be affected.

By weighting the differences between the anticipated and desired changes in the state rates of the aerodynamic vehicle, the method of the present invention effectively affects the desired change in the plurality of states of the aerodynamic vehicle in a manner which minimizes the associated costs, as defined by the weighting. In this regard, the cost of the change in the plurality of states of the aerodynamic vehicle is defined as follows:

$$cost(\bar{\delta}, \bar{w}, \bar{p}) = \left( \sum_{i=1}^{n} w_i \frac{1}{p_i} sgn\left(\left[\frac{\partial \dot{\bar{x}}}{\partial \bar{\delta}}\right]\bar{\delta} - \dot{\bar{x}}_{com}\right) \left\| \left[\frac{\partial \dot{\bar{x}}}{\partial \bar{\delta}}\right]\bar{\delta} - \dot{\bar{x}}_{com}\right\|^{p_i} \right)$$

As described above, this cost is minimized even in instances in which one or more of the actuators failed or are otherwise defective or frozen in position by design. In this regard, the control method is insensitive to the failure of one or more actuators since the remaining actuators are forced or commanded in the direction to bring about the desired change while minimizing the resulting costs. Since the continued use of the failed actuators will come at a large cost due to the predefined penalty $p_i$, the minimization of the cost will cause the other functional actuators to be recruited and repositioned to affect the desired change.

By minimizing the resulting cost of affecting the desired changes in the state rates of the aerodynamic vehicle, the control method of the present invention affects the desired changes in an efficient manner. By way of further explanation, it is noted that in instances in which $p_i=2$, the cost becomes the L2 norm that is defined as follows:

$$cost(\overline{\delta}, \overline{w}, \overline{p}) = \left( \sum_{i=1}^{n} w_i \frac{1}{2} \left( \left[ \frac{\partial \dot{x}}{\partial \delta} \right] \overline{\delta} - \dot{x}_{com} \right)^2 \right)$$

Similarly, in instances in which $p_i=1$, the cost becomes the L1 norm which is defined as follows:

$$cost(\overline{\delta}, \overline{w}, \overline{p}) = \left( \sum_{i=1}^{n} w_i \left\| \left[ \frac{\partial \dot{x}}{\partial \delta} \right] \overline{\delta} - \dot{x}_{com} \right\| \right)$$

Based upon the cost function, the affect of the predefined penalty $p_i$ that permits greater or lesser emphasis to be placed upon outliers, i.e., large differences between the anticipated and desired changes in the state rates, can be illustrated. In this regard, FIGS. 3 and 4 are two different graphical illustrations of the same curves representing the relationship between the cost and difference v between the anticipated and desired change in a respective state rate of an aerodynamic vehicle. As indicated, larger values of p, i.e., p>2, impose greater penalties upon outliers, thereby increasing the overall cost. Conversely, smaller values of p, i.e., 1<p<2, permit outliers to continue to contribute to the cost, thereby decreasing the cost. Thus, the control of the actuators may be tailored by a system designer or the like based upon the manner in which outliers which may be representative of an error or failure in the system are to be treated by either being excluded from the control system or by continuing to be included, either completely or in some partial degree. In addition, the control of the actuators may be further tailored as described above by establishing another weighting $w_i$ based upon the relative importance of the respective states of the aerodynamic vehicle.

Furthermore, both the continuous and discrete modes of the control method converge. As proof of the convergence of the continuous mode, it is initially assumed $$\overline{u} \equiv \overline{\delta}_c$$

that: $B(\overline{\theta}, \overline{u}) \equiv \left[ \frac{\partial \dot{x}}{\partial \delta} \right] \overline{\delta}_c$ $$\tilde{z} \equiv \dot{x}_{com}$$

Additionally, it is assumed that a continuous vector function $\overline{Z}=B(\overline{\theta},\overline{u})$ in which the elements of $\overline{u}$ are bounded by ($\underline{u}_i \leq u_i \leq \overline{u}_i$). In addition, it is assumed that a vector $\tilde{z}$ is slowly time varying, i.e., ($\dot{\tilde{z}} \ll 1$), and known. As such, an error function E for arbitrary constants $p_i>0$ and $w_i \geq 0$ is defined as follows:

$$E = \sum_i w_i * \left| \frac{z_i - \tilde{z}_i}{p_i} \right|^{p_i} = \sum_i w_i * \left| \frac{B(\overline{\theta}, \overline{u})_i - \tilde{z}_i}{p_i} \right|^{p_i}$$

This error function is always positive, i.e., $E \geq 0$, and monotonic with respect to $[(B(\overline{\theta},\overline{u})-\tilde{z})^T(B(\overline{\theta},\overline{u})-\tilde{z})]$, i.e. if $\left[ B(\overline{\theta},\overline{u})_a - \tilde{z} \right]^T \left[ B(\overline{\theta},\overline{u})_a - \tilde{z} \right] \geq \left[ B(\overline{\theta},\overline{u})_b - \tilde{z} \right]^T \left[ B(\overline{\theta},\overline{u})_b - \tilde{z} \right]$ then $E(\overline{u})_a \geq E(\overline{u})_b$ also, if $B(\overline{\theta},\overline{u})=\tilde{z}$, E=0

Note: if $p_i=2$, $\forall i$, the $L_2$ norm is obtained:

$$E = \sum_i w_i * \frac{1}{2}(z_i - \tilde{z}_i)^2 = \sum_i w_i * \frac{1}{2}(B(\overline{\theta}, \overline{u})_i - \tilde{z}_i)^2$$

$$E = \frac{1}{2}(\overline{z} - \tilde{z})^T W(\overline{z} - \tilde{z}) = \frac{1}{2}(B(\overline{\theta}, \overline{u}) - \tilde{z})^T W(B(\overline{\theta}, \overline{u}) - \tilde{z})$$

Also, if $p_i=1$, $\forall i$, the $L_i$ norm is obtained:

$$E = \sum_i w_i * |z_i - \tilde{z}_i| = \sum_i w_i * |B(\overline{\theta}, \overline{u})_i - \tilde{z}_i|$$

In order to determine $\overline{u}$ which minimizes E:

$$\min_{\overline{u}} E(\overline{u}) = \min_{\overline{u}} \sum_i w_i * \left| \frac{B(\overline{\theta}, \overline{u})_i - \tilde{z}_i}{p_i} \right|^{p_i}$$

Assume seperability between $\overline{\theta}$ and $\overline{u}$, i.e.

$$\frac{\partial \overline{\theta}}{\partial \overline{u}} = 0, \text{ and } \frac{\partial \overline{u}}{\partial \overline{\theta}} = 0$$

Assume $B(\overline{\theta},\overline{u})$ is quasi-static with respect to $\overline{\theta}$, i.e. $\frac{\partial B(\overline{\theta}, \overline{u})}{\partial \overline{\theta}} \frac{d\overline{\theta}}{dt} \approx 0$ Also assume $$\frac{\partial^2 B(\overline{\theta}, \overline{u})}{\partial u_j \partial u_i} \approx 0, \forall i \neq j$$

then $\frac{dB(\overline{\theta}, \overline{u})}{dt} \approx \frac{\partial B(\overline{\theta}, \overline{u})}{\partial \overline{u}} \frac{d\overline{u}}{dt}$ and $\frac{dB(\overline{\theta}, \overline{u})_i}{dt} \approx \frac{\partial B(\overline{\theta}, \overline{u})}{\partial u_i} \frac{du_i}{dt}$ $$\dot{E} = \frac{dE}{dt} =$$

$$\frac{\partial E}{\partial \overline{u}} \frac{d\overline{u}}{dt} \approx \sum_i w_i * sgn(B(\overline{\theta}, \overline{u})_i - \tilde{z}_i) |B(\overline{\theta}, \overline{u})_i - \tilde{z}_i|^{p_i-1} \frac{\partial B(\overline{\theta}, \overline{u})_i}{\partial \overline{u}_i} \frac{d\overline{u}_i}{dt}$$

For notational purposes define a vector value function:

$P(\overline{v},\overline{p})$, $P(\overline{v},\overline{p}), \overline{v}, \overline{p} \in \Re[n \times 1]$ such that $P(\overline{v},\overline{p})_i = sgn(v_i)|v_i|^{p_i-1}$ $$\dot{E} \approx P(B(\overline{\theta}, \overline{u}) - \tilde{z}, \overline{p})^T W \frac{\partial B(\overline{\theta}, \overline{u})}{\partial \overline{u}} \frac{d\overline{u}}{dt}$$

$$W = \begin{bmatrix} w_1 & 0 & 0 & 0 \\ 0 & w_2 & 0 & 0 \\ 0 & 0 & \ddots & 0 \\ 0 & 0 & 0 & w_N \end{bmatrix} \quad w_i \geq 0, \forall i$$

Define k as follows:

$$K = \begin{bmatrix} k_1 & 0 & 0 & 0 \\ 0 & k_2 & 0 & 0 \\ 0 & 0 & \ddots & 0 \\ 0 & 0 & 0 & k_M \end{bmatrix} \quad k_i \geq 0, \forall i$$

Now define a vector $\bar{v}$ as follows:

$$\bar{\dot{v}} = \frac{d\bar{v}}{dt} \equiv -K\left[\frac{\partial E}{\partial \bar{u}}\right]^T = -K\left[P(B(\bar{\theta},\bar{u}) - \bar{z}, \bar{p})^T W \frac{\partial B(\bar{\theta},\bar{u})}{\partial \bar{u}}\right]^T$$

$$\bar{\dot{v}} \equiv -K\left[\frac{\partial B(\bar{\theta},\bar{u})}{\partial \bar{u}}\right]^T W^T Q(B(\bar{\theta},\bar{u}) - \bar{z}, \bar{p})$$

Now let
$\dot{u}_i \equiv g_i h_i \dot{v}_i$
where $h_i = 0$ if $(u_i \geq \bar{u}_i \cap \dot{v}_i \geq 0) \cup (u_i \leq \underline{u}_i \cap \dot{v}_i \leq 0)$ else $h_i = 1$ $g_i = 1$ for $\underline{\dot{u}}_i \leq \dot{v}_i \leq \bar{\dot{u}}_i$ $$g_i = \frac{\underline{\dot{u}}_i}{\dot{v}_i}$$

for $\dot{v}_i < \underline{\dot{u}}_i$ {note ($\dot{v}_i < 0$ and $\dot{u}_i < 0$ and $g_i \in (0,1]$ for this case}

$$g_i = \frac{\bar{\dot{u}}_i}{\dot{v}_i}$$

for $\dot{v}_i > \bar{\dot{u}}_i$ {note ($\dot{v}_i > 0$ and $\dot{u}_i > 0$ and $g_i \in (0,1]$ for this case}

Given the initial $u_i \in [\underline{u}_i, \bar{u}_i]$ at (t=0) then $u_i \in [\underline{u}_i, \bar{u}_i]$, $\forall t \geq 0$ Note $g_i h_i k_i \geq 0$, $\forall i$ and GHK is a positive semi-definite diagonal matrix $$GHK = \begin{bmatrix} g_1 h_1 k_1 & & & 0 \\ & g_2 h_2 k_2 & & \\ & & \ddots & \\ 0 & & & g_n h_n k_n \end{bmatrix}$$

$$\dot{E} \approx -\left[\frac{\partial E}{\partial \bar{u}}\right] GHK \left[\frac{\partial E}{\partial \bar{u}}\right]^T \leq 0, \forall t \geq 0$$

thereby proving its convergence.

Similarly, the convergence of the discrete mode may be proved as follows:

$$E(\bar{u}^k) \approx E(\bar{u}^{k-1}) + \frac{\partial E}{\partial \bar{u}}(\bar{u}^k - \bar{u}^{k-1})$$

$E(\bar{u}) \geq 0, \forall \bar{u}$ $$\bar{u}^k \equiv \bar{u}^{k-1} - \Delta \frac{\partial E}{\partial \bar{u}}$$

$u_i^k = \min(u_i^k + \dot{\underline{u}}_{i\,\epsilon}, \max(u_i^k + \bar{\dot{u}}_i\,\epsilon, \min(\bar{u}_i, \max(\tilde{u}_i, \underline{u}_i))))$, $\epsilon = t^k - t^{k-1}$ $0 < \delta_j << 1$, $\forall j$ $$\Delta \equiv \begin{bmatrix} \delta_1 & 0 & 0 & 0 \\ 0 & \delta_2 & 0 & 0 \\ 0 & 0 & \ddots & 0 \\ 0 & 0 & 0 & \delta_M \end{bmatrix}$$

for small delta's $$E(\bar{u}^k) \approx E(\bar{u}^{k-1}) - \left[\frac{\partial E}{\partial \bar{u}}\right] \Delta \left[\frac{\partial E}{\partial \bar{u}}\right]^T$$

$E(\bar{u}^k) \leq E(\bar{u}^{k-1})$, $\forall k > 1$

Successive errors are always less than the previous error, and thus the process is convergent.

As indicated above, the method of controlling the plurality of actuators of an aerodynamic vehicle may be embodied by a computer program product that directs the operation of a flight control computer or the like to issue the commands to the plurality of actuators in order to affect the desired changes. In this regard, the computer program product includes a computer-readable storage medium, such as the on-volatile storage medium, and computer-readable program code portions, such as a series of computer instructions, embodied in the computer-readable storage medium. Typically, the computer program is stored by a memory device and executed by an associated processing unit, such as the flight control computer or the like.

In this regard, FIGS. 1 and 2 are block diagram, flowchart and control flow illustrations of methods and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of controlling a plurality of actuators of an aerodynamic vehicle having a plurality of states represented by a system state vector, the method comprising:

determining a first dot product of a vector representing the current commanded state of each of the plurality of actuators and a matrix representing changes in state rates of the aerodynamic vehicle in response to changes in the plurality of actuators, wherein the matrix is comprised of a plurality of terms, each term representing the change in a respective state rate of the aerodynamic vehicle in response to the change of a respective actuator;

obtaining a vector difference between the first dot product and a vector representing a desired change in the state rates of the aerodynamic vehicle;

weighting the vector difference based upon a predetermined criteria;

determining a second dot product of the weighted vector difference and a transpose of the matrix representing changes in the state rates of the aerodynamic vehicle in response to changes in the plurality of actuators; and controlling the plurality of actuators at least partially based upon the second dot product in order to implement at least a portion of the desired change in a time rate of change of the system state vector of the aerodynamic vehicle.

2. A method according to claim 1 wherein weighting the vector difference comprises weighting the vector difference based upon the relative importance of the respective states of the aerodynamic vehicle.

3. A method according to claim 1 wherein weighting the vector difference comprises weighting the vector difference based upon a predefined penalty having an effect that varies based upon the magnitude of a respective difference.

4. A method according to claim 1 further comprising limiting the permissible changes of at least one of the actuators, wherein controlling the plurality of actuators comprises controlling the plurality of actuators based upon the second dot product subject to limitations in the permissible changes of at least one of the actuators in order to implement at least a portion of the desired change in the plurality of state rates of the aerodynamic vehicle without exceeding the permissible changes of at least one of the actuators.

5. A method according to claim 4 wherein limiting the permissible changes of at least one of the actuators comprises limiting the permissible rate of change of at least one of the actuators.

6. A method according to claim 4 wherein limiting the permissible changes of at least one of the actuators comprises limiting at least one of the actuators to within a predefined range.

7. A method according to claim 1 further comprising weighting the second dot product based upon the relative importance of the respective actuators such that the plurality of actuators are controlled based, at least partially, weighted second dot product.

8. A method according to claim 1 further comprising repeatedly determining the current commanded state of each of the plurality of actuators and thereafter repeating the steps of determining the first dot product, obtaining the vector difference, weighting the vector difference and determining the second dot product so as to control the plurality of actuators based upon the current commanded state thereof.

9. A method of controlling a plurality of actuators of an aerodynamic vehicle having a plurality of states, the method comprising:

determining differences between anticipated changes in the plurality of states of the aerodynamic vehicle based upon the current commanded state of each of the plurality of actuators and desired changes in the plurality of states of the aerodynamic vehicle;

weighting the differences based upon at least one of the relative importance of the respective states of the aerodynamic vehicle and a predefined penalty having an effect that varies based upon the magnitude of a respective difference; and controlling the plurality of actuators at least partially based upon the weighted differences in order to implement at least a portion of the desired changes in the plurality of states of the aerodynamic vehicle.

10. A method according to claim 9 further comprising limiting the permissible changes of at least one of the actuators, wherein controlling the plurality of actuators comprises controlling the plurality of actuators based upon the weighted differences subject to limitations in the permissible changes of at least one of the actuators in order to implement at least a portion of the desired change in the plurality of states of the aerodynamic vehicle without exceeding the permissible changes of at least one of the actuators.

11. A method according to claim 10 wherein limiting the permissible changes of at least one of the actuators comprises limiting the permissible rate of change of at least one of the actuators.

12. A method according to claim 10 wherein limiting the permissible changes of at least one of the actuators comprises limiting at least one of the actuators to within a predefined range.

13. A method according to claim 9 further comprising repeatedly determining the current commanded state of each of the plurality of actuators and thereafter repeating the steps of determining the differences and weighting the differences so as to control the plurality of actuators based upon the current commanded state thereof.

14. A method according to claim 9 wherein determining the differences between the anticipated and desired changes in the plurality of states of the aerodynamic vehicle comprises:

determining a first dot product of a vector representing the current commanded state of each of the plurality of actuators and a matrix representing changes in the plurality of state rates of the aerodynamic vehicle in response to changes in the plurality of actuators, wherein the matrix is comprised of a plurality of terms, each term representing the anticipated change in a respective state rate of the aerodynamic vehicle in response to the change of a respective actuator; and obtaining a vector difference between the first dot product and a vector representing the desired change in the plurality of states of the aerodynamic vehicle, and wherein weighting the differences comprises weighting the vector difference.

15. A method according to claim 14 further comprising determining a second dot product of the weighted vector difference and a transpose of the matrix representing changes in the plurality of state rates of the aerodynamic vehicle in response to changes in the plurality of actuators, and wherein controlling the plurality of actuators is at least partially based upon the second dot product.

16. A method according to claim 15 further comprising weighting the second dot product based upon the relative importance of the respective actuators such that the plurality of actuators are controlled based, at least partially, weighted second dot product.

17. A method of controlling a plurality of actuators of an aerodynamic vehicle having a plurality of states, the method comprising:

determining differences between anticipated changes in the plurality of states of the aerodynamic vehicle based upon the current commanded state of each of the plurality of actuators and desired changes in the plurality of states of the aerodynamic vehicle;

limiting the permissible changes of at least one of the actuators; and controlling the plurality of actuators at least partially based upon differences between the anticipated and desired changes in the plurality of states of the aerodynamic vehicle subject to limitations in the permissible changes of at least one of the actuators in order to implement at least a portion of the desired change in the plurality of states of the aerodynamic vehicle without exceeding the permissible changes of at least one of the actuators.

18. A method according to claim 17 wherein limiting the permissible changes of at least one of the actuators comprises limiting the permissible rate of change of at least one of the actuators.

19. A method according to claim 17 wherein limiting the permissible changes of at least one of the actuators comprises limiting at least one of the actuators to within a predefined range.

20. A method according to claim 17 further comprising weighting the differences between the anticipated and desired changes based upon a predetermined criteria, and wherein controlling the plurality of actuators is at least partially based upon the weighted differences.

21. A method according to claim 20 wherein weighting the differences comprises weighting the differences based upon the relative importance of the respective states of the aerodynamic vehicle.

22. A method according to claim 20 wherein weighting the differences comprises weighting the differences based upon a predefined penalty having an effect that varies based upon the magnitude of a respective difference.

23. A method according to claim 17 further comprising repeatedly determining the current commanded state of each of the plurality of actuators and thereafter repeating the step of limiting the permissible changes of at least one of the actuators so as to control the plurality of actuators based upon the current commanded state thereof.

24. A method according to claim 17 wherein determining the differences between the anticipated and desired changes in the plurality of states of the aerodynamic vehicle comprises:

determining a first dot product of a vector representing the current commanded state of each of the plurality of actuators and a matrix representing changes in the plurality of state rates of the aerodynamic vehicle in response to changes in the plurality of actuators, wherein the matrix is comprised of a plurality of terms, each term representing the anticipated change in a respective state rate of the aerodynamic vehicle in response to the change of a respective actuator; and obtaining a vector difference between the first dot product and a vector representing the desired change in the plurality of states of the aerodynamic vehicle.

25. A method according to claim 24 further comprising determining a second dot product of a representation of the vector difference and a transpose of the matrix representing changes in the plurality of state rates of the aerodynamic vehicle in response to changes in the plurality of actuators, and wherein controlling the plurality of actuators is at least partially based upon the second dot product.

26. A method according to claim 25 further comprising weighting the second dot product based upon the relative importance of the respective actuators such that the plurality of actuators are controlled based, at least partially, weighted second dot product.

27. A computer program product for controlling a plurality of actuators of an aerodynamic vehicle having a plurality of states, the computer program product comprising a computer-readable storage medium having computer-readable program code embodied in said medium, the computer-readable program code comprising:

a first executable portion adapted to determine differences between anticipated changes in the plurality of states of the aerodynamic vehicle based upon the current commanded state of each of the plurality of actuators and desired changes in the plurality of states of the aerodynamic vehicle;

a second executable portion adapted to weight the differences based upon at least one of the relative importance of the respective states of the aerodynamic vehicle and a predefined penalty having an effect that varies based upon the magnitude of a respective difference; and a third executable portion adapted to issue control signals to the plurality of actuators at least partially based upon the weighted differences in order to implement at least a portion of the desired changes in the plurality of states of the aerodynamic vehicle.

28. A computer program product according to claim 25 further comprising a fourth executable portion adapted to limit the permissible changes of at least one of the actuators, wherein said fourth executable portion is adapted to control the plurality of actuators based upon the weighted differences subject to limitations in the permissible changes of at least one of the actuators in order to implement at least a portion of the desired change in the plurality of states of the aerodynamic vehicle without exceeding the permissible changes of at least one of the actuators.

29. A computer program product according to claim 28 wherein said fourth executable portion is adapted to limit the permissible rate of change of at least one of the actuators.

30. A computer program product according to claim 28 wherein said fourth executable portion is adapted to limit at least one of the actuators to within a predefined range.

31. A computer program product according to claim 27 wherein said first executable portion is adapted to determine a first dot product of a vector representing the current commanded state of each of the plurality of actuators and a matrix representing changes in the plurality of state rates of the aerodynamic vehicle in response to changes in the plurality of actuators, the matrix being comprised of a plurality of terms, each term representing the anticipated change in a respective state rate of the aerodynamic vehicle in response to the change of a respective actuator, wherein said first executable portion is further adapted to obtain a vector difference between the first dot product and a vector representing the desired change in the plurality of states of the aerodynamic vehicle, and wherein said second executable portion is adapted to weight the vector difference.

32. A computer program product according to claim 31 further comprising a fourth executable portion adapted to determine a second dot product of the weighted vector difference and a transpose of the matrix representing changes in the plurality of state rates of the aerodynamic vehicle in response to changes in the plurality of actuators, and wherein said third executable portion is adapted to issue control signals to the plurality of actuators that are at least partially based upon the second dot product.

33. A computer program product according to claim 32 further comprising a fifth executable portion adapted to weight the second dot product based upon the relative importance of the respective actuators such that the plurality of actuators are controlled based, at least partially, weighted second dot product.

34. A computer program product for controlling a plurality of actuators of an aerodynamic vehicle having a plurality of states, the computer program product comprising a computer-readable storage medium having computer-readable program code embodied in said medium, the computer-readable program code comprising:

a first executable portion adapted to determine differences between anticipated changes in the plurality of states of the aerodynamic vehicle based upon the current commanded state of each of the plurality of actuators and desired changes in the plurality of states of the aerodynamic vehicle;

a second executable portion adapted to limit the permissible changes of at least one of the actuators; and a third executable portion adapted to issue control signals to the plurality of actuators at least partially based upon differences between the anticipated and desired changes in the plurality of states of the aerodynamic vehicle subject to limitations in the permissible changes of at least one of the actuators in order to implement at least a portion of the desired change in the plurality of states of the aerodynamic vehicle without exceeding the permissible changes of at least one of the actuators.

35. A computer program product according to claim 34 wherein said second executable portion is adapted to limit the permissible rate of change of at least one of the actuators.

36. A computer program product according to claim 34 wherein said second executable portion is adapted to limit at least one of the actuators to within a predefined range.

37. A computer program product according to claim 34 further comprising a fourth executable portion adapted to weight the differences between the anticipated and desired changes based upon a predetermined criteria, and wherein said third executable portion is adapted to issue control signals to the plurality of actuators that are at least partially based upon the weighted differences.

38. A computer program product according to claim 37 wherein said fourth executable portion is adapted to weight the differences based upon the relative importance of the respective states of the aerodynamic vehicle.

39. A computer program product according to claim 37 wherein said fourth executable portion is adapted to weight the differences based upon a predefined penalty having an effect that varies based upon the magnitude of a respective difference.

40. A computer program product according to claim 34 wherein said first executable portion is adapted to determine a first dot product of a vector representing the current commanded state of each of the plurality of actuators and a matrix representing changes in the plurality of state rates of the aerodynamic vehicle in response to changes in the plurality of actuators, the matrix being comprised of a plurality of terms, each term representing the anticipated change in a respective state rate of the aerodynamic vehicle in response to the change of a respective actuator, and wherein said first executable portion is further adapted to obtain a vector difference between the first dot product and a vector representing the desired change in the plurality of states of the aerodynamic vehicle.

41. A computer program product according to claim 40 further comprising a fourth executable portion adapted to determine a second dot product of a representation of the vector difference and a transpose of the matrix representing changes in the plurality of state rates of the aerodynamic vehicle in response to changes in the plurality of actuators, and wherein said third executable portion is adapted to issue control signals to the plurality of actuators that are at least partially based upon the second dot product.

42. A computer program product according to claim 41 further comprising a fifth executable portion adapted to weight the second dot product based upon the relative importance of the respective actuators such that the plurality of actuators are controlled based, at least partially, weighted second dot product.

* * * * *